Oct. 18, 1966  K. STOLZ  3,279,173
HYDROSTATIC DRIVE
Filed April 5, 1965  3 Sheets-Sheet 3

Karl Stolz
INVENTOR.

BY Karl G. Ross
Attorney

United States Patent Office 3,279,173
Patented Oct. 18, 1966

3,279,173
HYDROSTATIC DRIVE
Karl Stolz, Bohlenweg, Germany, assignor to Gesellschaft für Linde's Eismaschinen Aktiengesellschaft, Wiesbaden, Germany, a corporation of Germany
Filed Apr. 5, 1965, Ser. No. 445,585
Claims priority, application Germany, Apr. 4, 1964, G 40,270
12 Claims. (Cl. 60—53)

My present invention relates to hydrostatic drives and transmissions of the type in which an adjustable pump is coupled with a hydrostatic motor to enable torque and speed variation.

The art of hydraulic transmissions and components thereof is well developed and many hydraulic pumps and motors have been proposed heretofor for combination into torque converters, fluid couplings, speed-changing devices and the like. In the case of hydrostatic machine elements, which constitute the subject matter of the present invention, such drives generally include a reservoir for the medium, a hydrostatic pump supplied with fluid from this reservoir and a hydrostatic motor connected with the pump by suitable ducts for displacement of an output element with a torque and/or speed ratio determined by the position of an adjustable element. The pump can be provided with an input or driven shaft which is rotatable by a prime or secondary mover or by any other source of rotational displacement, while the motor has an output or driven shaft connectable with a load or the like. In many applications in which a hydrostatic drive or transmission would be highly desirable, conventional mechanisms of this character could not be used because of size limitations. This problem is especially pronounced when the input and output shafts of the transmission are required to be substantially parallel to one another.

It is, therefore, the principal object of the present invention to provide a hydrostatic drive of a highly compact nature and adapted to be employed for many purposes from which such drives were formerly barred because of their unwieldy and bulky character.

A more specific object of this invention is to provide an improved compact hydrostatic-transmission assembly having input and output shafts extending generally parallel to one another.

Still another object of this invention is to provide a relatively simple and inexpensive hydrostatic drive having improved means for adjusting the controllable component and a particularly advantageous and effective arrangement of its components.

These objects and others which will become apparent hereinafter are attained, in accordance with the present invention, through the provision of a hydrostatic assembly whose outer dimensions are minimized by disposing a hydrostatic pump and a hydrostatic motor in a common housing forming the receptacle or reservoir for the hydraulic medium and having input and output shafts extending parallel to one another with a limited lateral spacing; according to the present invention, the hydrostatic axial-piston motor comprises a cylinder drum rotatable about its axis with respect to a control surface, distributive plate or regulating "level," the axis including with a first plane through the axis of the parallel shafts an acute angle ranging between substantially 30 and 60° in its projection on a plane perpendicular to the axial plane of the shafts; preferably, this included angle (between the projection of the axis of the motordrum and the axial plane of the shafts) is approximately 45°. Thus, the center of the control or distributory surface of the hydrostatic motor, whose pistons are axially displaceable in respective cylinder bores of the drum, lies laterally of the axial plane of the shafts. Moreover, this invention provides that the axis of the motor drum be inclined to a further plane extending perpendicular to the aforesaid axial plane and transversely of the input and output shafts. In this case, the center point of the control surface of the motor is spaced from the axis of the input shaft of the pump by a distance greater than the length of the intersection of the axial and further planes between the input shaft and the intersection of the axis of the cylinder drum therewith.

According to another feature of the present invention, the hydrostatic pump comprises a cylinder drum swingable for adjustment of the stroke of its axially displaceable pistons about a pivotal axis lying in the plane of the shafts. In this manner it is possible to maintain a maximum displacement for the control elements without interference by the axial-piston motor, which is in such proximity to the pump as to insure an overall compactness for the assembly. In fact, the location of the center of the control surface with a greater spacing from the driveshaft than the distance of the driven or output shaft therefrom insures that a minimum of offset of the mutually parallel shafts need be provided.

Still another feature of the present invention resides in an arrangement whereby the input and output shafts each extend in opposite directions from the housing and are associated with a respective control disk, swash plate or stroke-determining flange carried by the shaft.

It will be understood that, in the conventional manner, adjustment of the transmission can be effected by varying the angle of intersection between the respective flange and the axis of the cylinder drum. In accordance with this aspect of the invention the control surface of the hydrostatic motor lies proximally to or substantially in the plane of the flange or disk of the pump so that the overall extension of the drive in the plane of the shafts is minimized. Moreover, the axis of the adjustable or swinging portions of the pump can lie in the plane of the control surface of the motor and preferably at the intersection thereof with the axis of the motor drum. Advantageously, the swinging axis of the enclosure of the pump and, therefore, its cylinder drum lies in the axial plane of the input and output shafts so that the swinging movement is not limited by the position of the hydrostatic motor adjacent the enclosure.

According to another aspect of this invention, the pump enclosure (and any other swinging portions of the device required for adjustment of the stroke of the axial pistons) can be pivotally mounted in a block or pedestal which simultaneously forms the control surface for the hydrostatic motor. The other journal block for the pump enclosure can be connected via a conduit means with the control surface of the hydrostatic motor. The conduit means extends between the pump and the housing along the axis of swinging movement of the enclosure so that the housing need only be of sufficient width or clearance to accommodate this swinging movement in order simultaneously to allow for the passage of the conduit means. Preferably, this conduit means consists of two rigid and rectilinear extending ducts including with one another a relatively large obtuse angle so as to minimize pressure drop in the fluid. At the junction between these ducts there may be provided, according to this invention, a junction affixed to the housing and formed with a passage interconnecting the ducts which are sealingly coupled with this body. This ararngement permits the housing to be extremely compact without creating difficulties with regard to pressure drops and possible leakage in the conduit means.

The above and other objects, features and advantages of the present invention will become more readily apparent from the following description, reference being made to the accompanying drawing in which.

Figure 1:
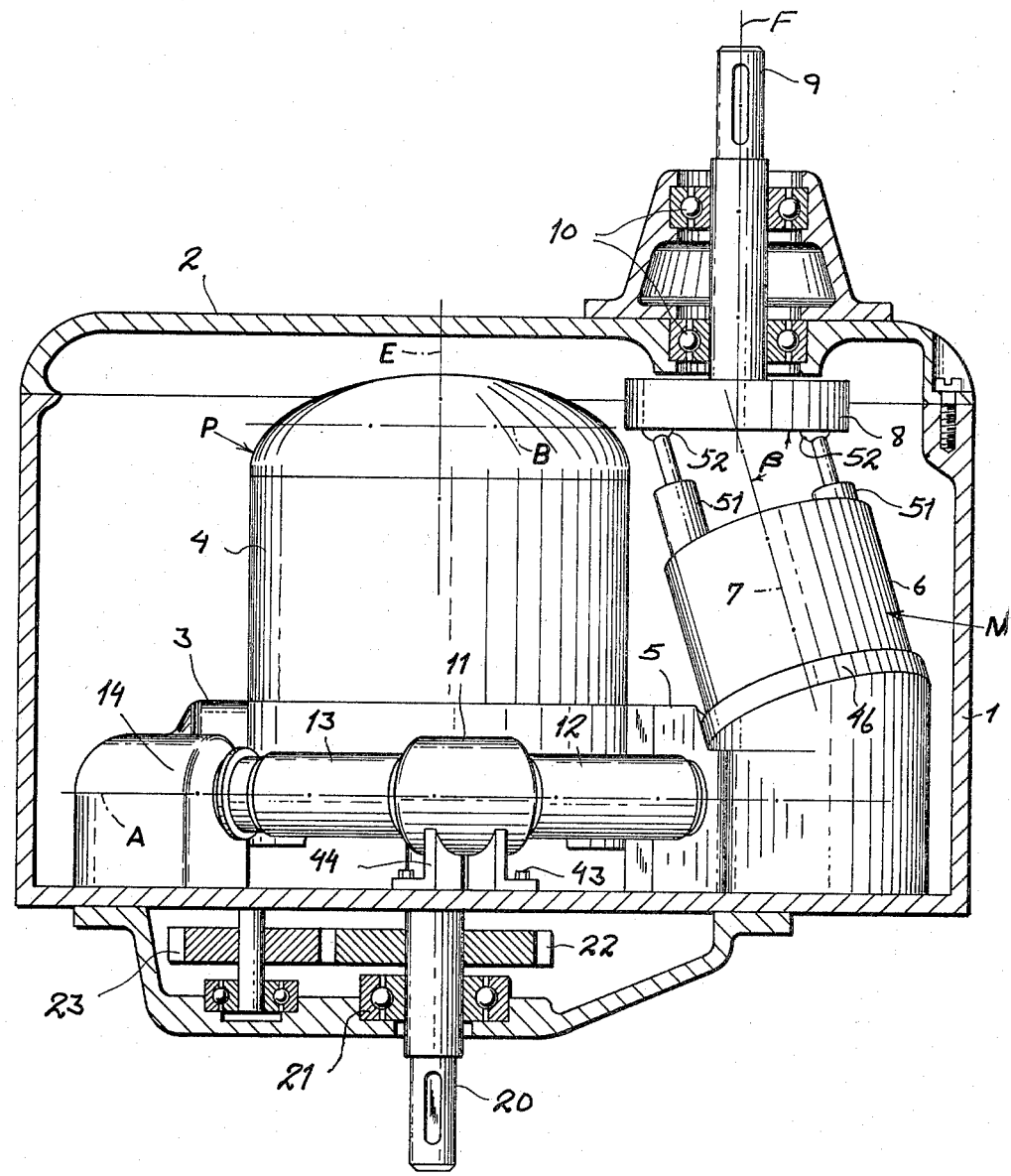
FIG. 1 is an axial cross-sectional view through a hydrostatic-drive assembly according to this invention.
Figure 2:
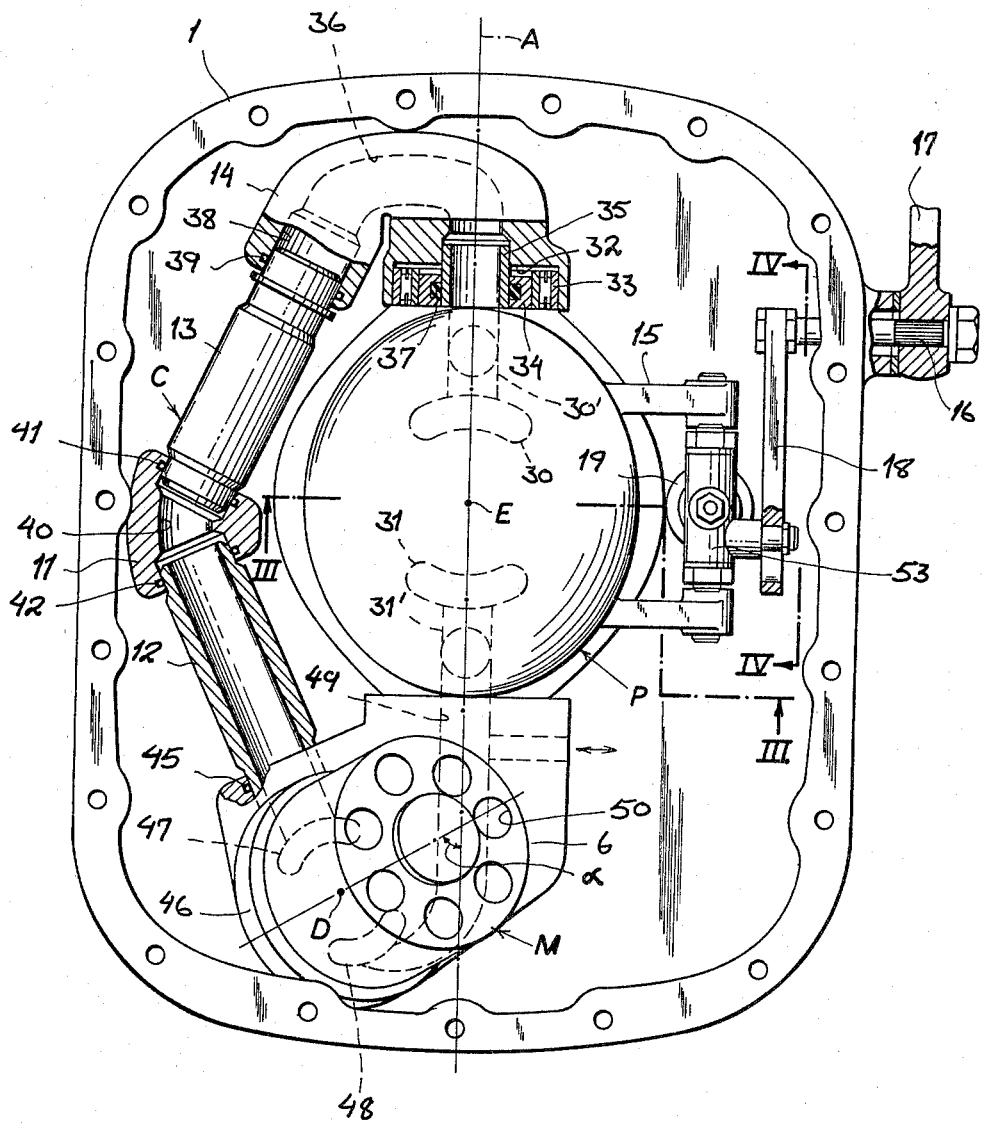
FIG. 2 is a plan view of the assembly with the cover of the housing removed and parts broken away.
Figure 3:
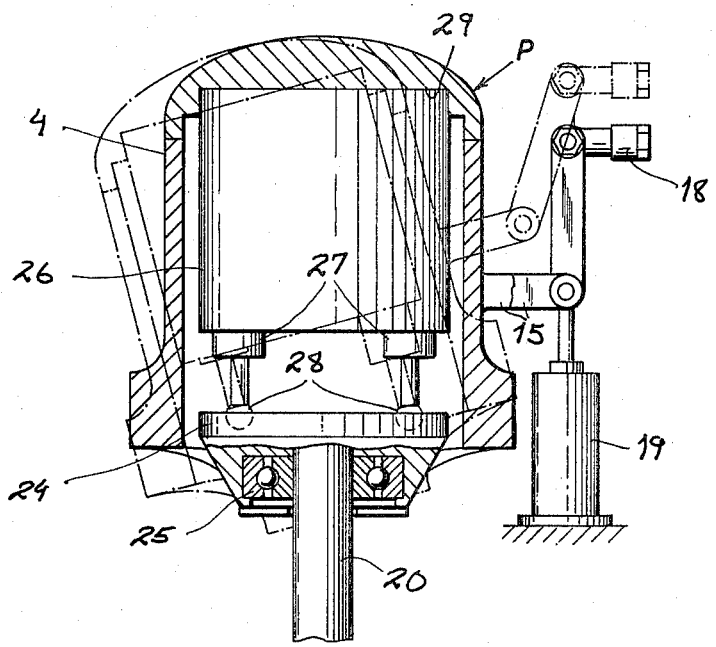
FIG. 3 is a cross-sectional view taken generally along the line III—III of FIG. 2.

In the drawing, there is shown a transmission housing 1 which forms a reservoir for hydraulic medium and is closed by a cover 2. The input or drive shaft 20 of the pump P is journaled in the housing 1 via a bearing 21 and carries a gear 22 to which a gear train 23 can be coupled for direct mechanical drive of, or by shaft 20. The pump P is formed with an enclosure 4 which is swingably mounted within the housing in a pair of journal blocks 3, 5 about an axis indicated at A (FIGS. 1 and 2). The pump is preferably of the axial-piston type and can have, as illustrated in FIG. 3, a stroke-control disk 24 carried by the shaft 20 which also is rotatably supported in the housing 1 by a bearing 25 connected with the fixed portions of the journal blocks 3 and 5. A hydrostatic pump of this general character is disclosed, for example, in U.S. Patent No. 2,931,250 issued April 5, 1960; this patent discloses the mode of operation of the control surfaces or levels of hydrostatic pumps and motors, the means for supplying additional fluid to the system from the reservoir and several control mechanisms applicable to the present invention. It will be understood that these operational aspects of the device are fully disclosed in this patent and others of its class and will not be discussed in detail herein since they are well known in the art. The pump P may, therefore, have its cylinder drum 26 rotatably journaled in the housing or enclosure 4 in such manner that the pistons 27 axially reciprocable in the cylinder bores of drum 26 engage the disk 24 via ball joints 28 to permit the swiveling movement. In the usual manner, the drum 26 slidably engages a control surface 29 drum with kidney-shaped channels 30, 31 which register with the cylinder bores as the drum 26 rotates within the enclosure 4 for supplying fluid to and moving it from the bores as the pistons are reciprocated. The control surface or level 29 thus serves as a distributor for the fluid. Channels 30 and 31 are connected to the conduit means via passage 30' and 31', the latter communicating with the housing.

As indicated earlier, the enclosure 4 is swingably mounted in the pair of journal blocks 3, 5, one of which is shown in section in FIG. 2. The block 3 has a recess 32 in which a bearing 33 is received between a boss 34 of the enclosure 4 and the block 3. The channel 30 and its passage 30' communicate with a nipple 35 which opens into a passage 36 in the block 3 and is surrounded by a seal 37 to prevent loss of fluid pressure. The generally U-shaped passage 36 in block 3 terminates in a connecting piece 14 whose recess 38 receives a pipe 13. An O-ring seal 39 ensures a leak-proof connection between the male portion of the rigid pipe 13 and the block 3 and its female connecting portion 14. The straight pipe 13 terminates at its opposite extremity in an intermediate body 11 formed with the passage 40 and receiving the end of pipe 13 and a further straight pipe 12. Respective O-rings 41 and 42 ensure a sealing engagement of the pipes with the intermediate body which is held in place by bolts 43 via lugs 44. The pipe 12 terminates in block 5 in which a further sealing ring 45 prevents leakage.

Block 5 forms the control surface for lever 46 for the cylinder drum 6 of the hydrostatic motor M. As best seen in FIGS. 1 and 2, the cylinder drum 6 of motor M rests upon and is rotatable about its axis 7 with respect to the control surface 46; the latter is provided with the usual kidney-shaped channels 47 and 48 communicating, respectively, with the pipe 12 of the conduit means C and with the passage 31' via a passage 49 formed in the block 5 and similar to passage 36. The control surface 46 thus supplies hydraulic fluid to and conveys it from the cylinder bores 50 of the motor M in which the pistons 51 are axially displaceable. The pistons 51 engage the stroke-controlling disk 8 of the motor M via ball joints 52, the disk 8 being rigid with the output shaft 9 of the assembly. Shaft 9 extends parallel to the input shaft 20 and is journaled in the bearing 10 of the housing while extending therefrom at the side opposite that at which the input shaft 20 projects.

Figure 4:
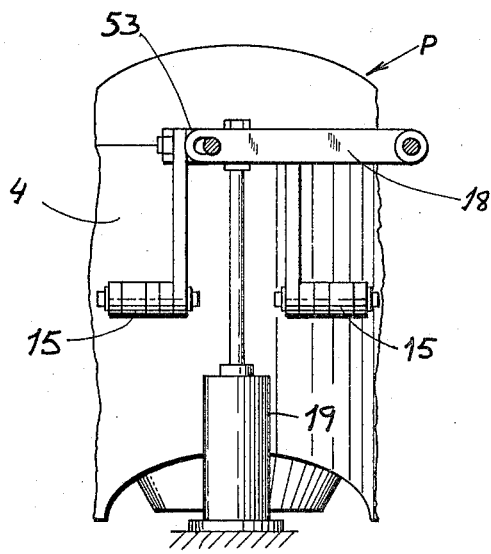
FIG. 4 is a detail view of the adjusting means of the assembly taken along IV—IV of FIG. 2.

The control means for the adjustable portions of the pump, according to this invention, are best seen in FIGS. 2–4 and can comprise a control shaft 16 journaled in the housing and rotatable by a manually operable lever 17 keyed to this shaft. The shaft 16 carries a further lever or arm 18, which represents any suitable linkage means for swinging the enclosure 4 of the pump P about the axis A. Arm 18 can thus engage a pivotal connecting member 53 which is swingably mounted between the arms 15 rigid with the enclosure 4. It will be apparent, therefore, that rotation of shaft 16 by lever 17 will displace the arm 18 and shifts the body 53 to swing the enclosure 4. A servomotor 19 (e.g., Selsyn, hydraulic cylinder or the like) can also engage the body 53 as illustrated in FIGS. 2–4 for swinging movement of the enclosure 4 to vary the stroke of pistons 27 (the dot-dash position in FIG. 3).

From the drawing, it will be seen that the axis A of the swinging movement of enclosure 4 of the pump is coplanar with the axes F and E of shafts 9 and 20 so that sufficient room is provided between the housing and the pump P to permit the lateral swinging movement thereof and yet accommodate the control means 15–19 and 53 and the conduit means 11–14 etc. Moreover, the axis 7 of the drum 6 includes an angle α with this axial plane, this angle ranging from 30–60° but preferably being about 45°. In addition, axis 7 of drum 6 includes an acute angle β with a plane B perpendicular to the shafts 9 and 20. It will be evident, therefore, that the distance between the center point D of the control surface 46 of the motor (i.e. the intersection of axis 7 with surface 46) and the axis E of the shaft 20 is greater than the distance between this axis and the axis F of shaft 9. Moreover, the control surface 29 of the pump P lies substantially along the plane B of the disk 8 in the normal or upright position of the enclosure 4.

The invention described and illustrated is believed to admit of many modifications within the ability of persons skilled in the art, all such modifications being considered within the spirit and scope of the appended claims.

I claim:

1. A hydrostatic drive comprising a housing; a hydrostatic axial-piston pump in said housing having an input shaft rotatably mounted therein; an axial-piston hydrostatic motor in said housing having an output shaft rotatably mounted therein and substantially parallel to said input shaft, said shafts having a common axial plane; conduit means interconnecting said pump and said motor for conducting operating fluid to and from the latter upon rotation of said input shaft, said hydrostatic motor having a cylinder drum and axially arranged pistons therein for rotating said output shaft, said drum having an axis whose projection in a further plane perpendicular to said shafts includes with said axial plane an angle of substantially 30° to 60°; and mounting means for pivotally supporting said pump in said housing for swinging movement about an axis in said plane.

2. A hydrostatic drive as defined in claim 1 wherein the angle included between said projection of said axis of said cylinder drum and said axial plane is substantially 45°.

3. A hydrostatic drive as defined in claim 1 wherein said axial-piston pump comprises an enclosure, a respective cylinder drum mounted in said enclosure, and a plurality of axially extending pistons reciprocably mounted in said drum and displaceable upon rotation of said input shaft, said enclosure being swingably supported on said mounting means for adjustment of the stroke of said pistons, the hydrostatic drive further comprising means for swinging said enclosure about its axis with respect to said input shaft.

4. A hydrostatic drive as defined in claim 1 wherein said hydrostatic pump comprises a respective cylinder drum cooperating with said input shaft for applying fluid pressure to said hydrostatic motor, each of said cylinder drums being formed with a plurality of axially extending cylinder bores and respective axially reciprocable pistons displaceable in said bores, said pump and said motor each further comprising a respective control surface co-operating with the respective drum at one end thereof for supplying hydraulic fluid to and removing said fluid from the bores of the respective drum and a respective disk at the other end of each drum engageable by the pistons of the respective drum for determining the stroke of the pistons, said control surface of said motor lying subbstantially in the plane of the disk of said pump.

5. A hydrostatic drive as defined in claim 4 wherein the axis of said cylinder drum of said pump is inclined toward another plane through the axis of said output shaft perpendicular to said axial plane, said shaft being journaled in said housing and extending in opposite direction therefrom with a lateral spacing less than that between the intersection of said axis of said cylinder drum of said motor with the respective control surface and the axis of said input shaft.

6. A hydrostatic drive as defined in claim 4 wherein said housing forms a reservoir for said fluid.

7. A hydrostatic drive as defined in claim 4 wherein said hydrostatic pump comprises an enclosure for the respective cylinder drum, said mounting means comprising a pair of journal blocks affixed to said housing and pivotally supporting said enclosure for swinging movement about an axis lying substantially in said axial plane and perpendicular to said input shaft.

8. A hydrostatic drive as defined in claim 7 wherein at least one of said journal blocks forms a passage constituting part of said conduit means.

9. A hydrostatic drive as defined in claim 7 wherein one of said journal blocks is interposed between said pump and said motor and forms said control surface of said motor, the other of said journal blocks being formed with a passage communicating between said control surfaces.

10. A hydrostatic drive as defined in claim 9 wherein said conduit means includes duct means interconnecting said control surface of said motor with said other of said journal blocks, said duct means comprising at least two rectilinear pipes bridging said journal blocks and sealingly affixed thereto, and at least one intermediate body formed with a passage interconnecting said pipes and sealingly engaging respective extremities thereof.

11. A hydrostatic drive as defined in claim 10 wherein said body is secured to said housing and said pipes include at said body a large obtuse angle.

12. A hydrostatic drive comprising a generally prismatic housing forming a reservoir for a fluid medium; a pair of journal blocks affixed to said housing and spaced apart therein intermediate a pair of longitudinally extending housing walls; a hydrostatic pump in said housing having an enclosure swingably mounted on said journal blocks for rotating about an axis parallel to said walls, said pump being spaced from said walls with lateral clearances and having an input shaft journaled in said housing for rotation about an axis perpendicular to the pivotal axis of said enclosure, a first cylinder drum rotatably mounted in said enclosure and pivotable therewith relative to said shaft, said shaft having a disk lying substantially in the plane of said pivotal axis of said enclosure, a plurality of axially reciprocable pistons carried by said drum and engageable with said disk for displacement of said medium, and a control surface in said enclosure co-operating with said first drum for distributing fluid displaced by said pistons; a hydrostatic motor mounted on one of said journal block and having a second cylinder drum rotatable relatively thereto, said one of said journal blocks forming a control surface co-operating with said drum for distributing fluid medium thereto, said motor further comprising an output shaft substantially coplanar with and parallel to said input shaft while being journaled in said housing, another disk rigid with said output shaft and substantially coplanar with said control surface of said pump in a position of said first cylinder drum in axial alignment with said input shaft, and a plurality of axially reciprocable pistons carried by said second cylinder drum and co-operating with said disk of said output shaft for driving same, said control surface of said second cylinder drum having a center point spaced from said axis of said input shaft by a distance greater than the distance between the axis of said input and said output shafts; and conduit means including said journal block and at least one duct interconnecting said control surfaces and lying in one of said lateral clearances for fluid transmission between said surfaces.

References Cited by the Examiner
UNITED STATES PATENTS

| | | | |
|---|---|---|---|
| 3,107,491 | 10/1963 | Kaup et al. | 60—53 |
| 3,123,975 | 3/1964 | Ebert | 60—53 |
| 3,163,987 | 1/1965 | Dowty et al. | 60—53 |

EDGAR W. GEOGHEGAN, *Primary Examiner.*